(12) United States Patent
Beck et al.

(10) Patent No.: US 8,237,082 B2
(45) Date of Patent: Aug. 7, 2012

(54) METHOD FOR PRODUCING A HOLE

(75) Inventors: Thomas Beck, Panketal (DE); Silke Settegast, Berlin (DE)

(73) Assignee: Siemens Aktiengesellschaft, München (DE)

( * ) Notice: Subject to any disclaimer, the term of this patent is extended or adjusted under 35 U.S.C. 154(b) by 702 days.

(21) Appl. No.: 12/223,204

(22) PCT Filed: Jan. 5, 2007

(86) PCT No.: PCT/EP2007/050101
§ 371 (c)(1),
(2), (4) Date: Jul. 24, 2008

(87) PCT Pub. No.: WO2007/085516
PCT Pub. Date: Aug. 2, 2007

(65) Prior Publication Data
US 2010/0147812 A1    Jun. 17, 2010
US 2012/0091106 A9    Apr. 19, 2012

Related U.S. Application Data

(63) Continuation-in-part of application No. 10/574,724, filed as application No. PCT/EP2004/009793 on Sep. 2, 2004, now Pat. No. 7,816,625.

(30) Foreign Application Priority Data

Jan. 24, 2006 (EP) .................................... 06001467

(51) Int. Cl.
*B23K 26/38* (2006.01)
(52) U.S. Cl. ............................ 219/121.71; 219/121.61

(58) Field of Classification Search ........... 219/121.67–121.72, 121.76, 121.77, 219/121.61, 121.85
See application file for complete search history.

(56) References Cited

U.S. PATENT DOCUMENTS

| | | | |
|---|---|---|---|
| 4,818,834 A * | 4/1989 | Rupert | 219/69.17 |
| 5,073,687 A | 12/1991 | Inagawa et al. | |
| 5,268,556 A * | 12/1993 | Coyle et al. | 219/121.76 |
| 5,747,769 A * | 5/1998 | Rockstroh et al. | 219/121.71 |
| 5,841,099 A * | 11/1998 | Owen et al. | 219/121.69 |
| 5,939,010 A | 8/1999 | Yuyama et al. | |
| 6,024,792 A | 2/2000 | Kurz et al. | |
| 6,054,673 A | 4/2000 | Chen | |
| 6,172,331 B1 | 1/2001 | Chen | |

(Continued)

FOREIGN PATENT DOCUMENTS

DE  19719700 A1 * 11/1998

(Continued)

OTHER PUBLICATIONS

Voisey et al., "Laser drilling of cooling holes through plasma sprayed thermal barrier coatings", Surface Coatings Technology, Jan. 2004, pp. 296-306, Issue 3, vol. 176.

*Primary Examiner* — Samuel M Heinrich

(57) ABSTRACT

There is described a method for producing a hole using e.g. a lasers, wherein short laser pulse durations are used. The laser pulse durations are varied, short laser pulse durations being utilized only in the area to be removed in which an influence on the penetration behavior and discharge behavior is noticeable while longer pulse durations of >0.4 ms are used. This is the case for the inner surface of a diffuser of a hole, for example, which can be produced very accurately by means of short laser pulse durations.

27 Claims, 9 Drawing Sheets

U.S. PATENT DOCUMENTS

| | | |
|---|---|---|
| 6,479,788 B1 | 11/2002 | Arai et al. |
| 6,676,878 B2 * | 1/2004 | O'Brien et al. ............... 264/400 |
| 6,703,137 B2 * | 3/2004 | Subramanian ............... 428/469 |
| 7,816,625 B2 * | 10/2010 | Beck et al. ............... 219/121.71 |
| 2002/0185474 A1 * | 12/2002 | Dunsky et al. ............. 219/121.7 |
| 2004/0173942 A1 | 9/2004 | Kobayashi et al. |

FOREIGN PATENT DOCUMENTS

| | | |
|---|---|---|
| DE | 100 63 309 A1 | 7/2002 |
| EP | 0 486 489 B1 | 11/1994 |
| EP | 0 412 397 B1 | 3/1998 |
| EP | 0 892 090 A1 | 1/1999 |
| EP | 0 786 017 B1 | 3/1999 |
| EP | 1 306 454 A1 | 5/2003 |
| EP | 1 319 729 A1 | 6/2003 |
| EP | 1 204 776 81 | 6/2004 |
| EP | 1 510 593 A1 | 3/2005 |
| JP | 03027885 A * | 2/1991 |
| RU | 219341 C2 | 6/2002 |
| RU | 2193957 C2 | 12/2002 |
| WO | WO 99/67435 A1 | 12/1999 |
| WO | WO 00/44949 A1 | 8/2000 |
| WO | WO 2005/044508 A1 | 5/2005 |

* cited by examiner

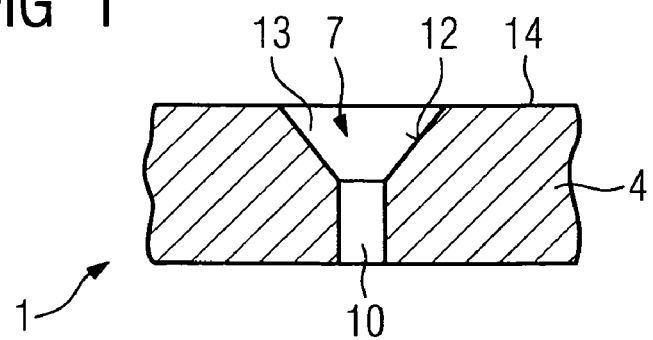
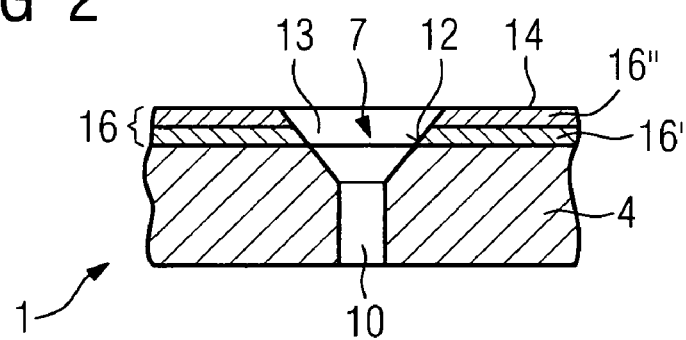
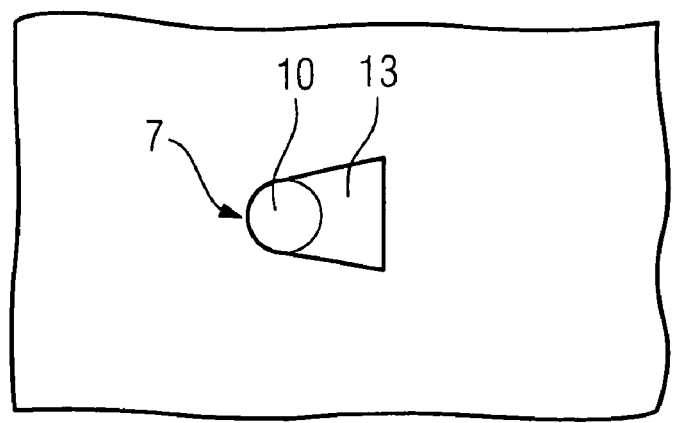

METHOD FOR PRODUCING A HOLE

CROSS REFERENCE TO RELATED APPLICATIONS

This application is the US National Stage of International Application No. PCT/EP2007/050101, filed Jan. 5, 2007 and claims the benefit thereof. The International Application claims the benefits of European Patent Office application No. 06001467.7 filed Jan. 24, 2006, both of the applications are incorporated by reference herein in their entirety. This application is also a continuation-in-part of U.S. application Ser. No. 10/574,724 filed on Apr. 6, 2006 (now U.S. Pat. No. 7,816,625), which is the U.S. National Stage of International Application No. PCT/EP2004/009793, filed on Sep. 2, 2004.

FIELD OF INVENTION

The invention relates to a method for producing a hole.

BACKGROUND OF INVENTION

For many components, castings in particular, ablations subsequently need to be carried out for instance to form indentations or through-holes. Particularly for turbine components which have film cooling holes for cooling, holes are subsequently introduced after production of the component.

Such turbine components often also have layers, for example a metallic layer or interlayer and/or a ceramic outer layer. The film cooling holes must then be produced through the layers and the substrate (casting).

U.S. Pat. No. 6,172,331 and U.S. Pat. No. 6,054,673 disclose a laser boring method for introducing holes into layer systems, ultrashort laser pulse lengths being used. A laser pulse length is found from a particular laser pulse length range and the hole is thereby produced.

DE 100 63 309 A1 discloses a method for producing a cooling air opening by means of the laser, in which the laser parameters are adjusted so that material is ablated by sublimation.

U.S. Pat. No. 5,939,010 discloses two alternative methods for producing a multiplicity of holes. In one method (FIGS. 1, 2 of the US patent) one hole is initially produced fully before the next hole is produced. In the second method, the holes are produced stepwise, by first producing a first subregion of a first hole then a first subregion of a second hole etc. (FIG. 10 of the US patent). Different pulse lengths may be used in the two methods, but the pulse length used in a given method is always the same. The two methods cannot be interlinked.

The cross-sectional area of the region to be ablated always corresponds to the cross section of the hole to be produced.

U.S. Pat. No. 5,073,687 discloses the use of a laser for producing a hole in a component, which is formed by a substrate with a copper layer on both sides. Initially a hole is produced through the copper film by means of a longer pulse duration, and then a hole is produced by means of shorter pulses in the substrate consisting of a resin, a hole subsequently being produced through a copper layer on the rear side with a higher output power of the laser. The cross-sectional area of the region to be ablated corresponds to the cross section of the hole to be produced.

U.S. Pat. No. 6,479,788 B1 discloses a method for producing a hole, in which longer pulses are used in a first step than in a further step. The pulse duration is varied here in order to produce an optimal rectangular shape in the hole. The cross-sectional area of the beam is also increased as the pulse length decreases.

The use of such ultrashort laser pulses is expensive and very time-intensive owing to their low average powers.

SUMMARY OF INVENTION

It is therefore an object of the invention to overcome this problem.

The object is achieved by a method as claimed in an independent claim, wherein e.g. different pulse lengths and pulse lengths of >0.4 ms for the longer pulse lengths are used.

It is particularly advantageous for shorter pulses to be used only in one of the first ablation steps, in order to generate optimal properties in the outer surface region of the interface since these are crucial for the outflow behavior of a medium from the hole and for the flow behavior of a medium around this hole.

In the interior of the hole, the properties of the interface are less critical, so that longer pulses which cause inhomogeneous interfaces may be used there.

Further advantageous measures of the method or the device are listed in the dependent claims of the method.

The measures listed in the dependent claims may advantageously be combined with one another in any desired way.

BRIEF DESCRIPTION OF THE DRAWINGS

The invention will be explained in more detail with the aid of the figures, in which:
FIG. 1 shows a hole in a substrate,
FIG. 2 shows a hole in a layer system,
FIG. 3 shows a plan view of a through-hole to be produced.

DETAILED DESCRIPTION OF INVENTION

Figure 4:
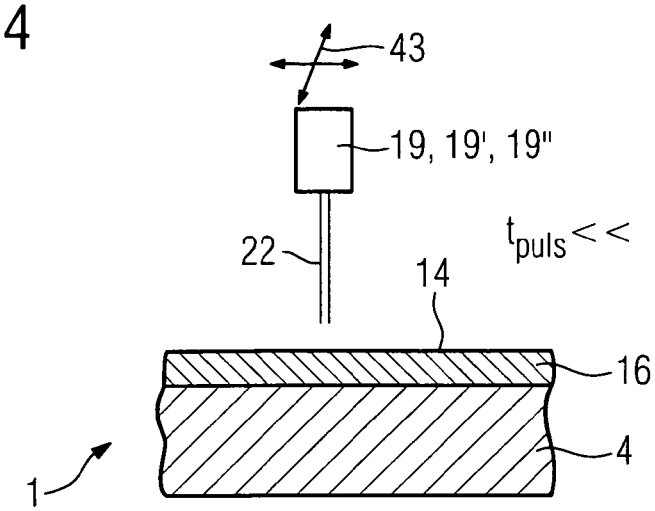
FIGS. 4-11 show ablation steps of the method according to the invention.

Description of the Component with a Hole
FIG. 1 shows a component 1 with a hole 7.
The component 1 consists of a substrate 4 (for example a casting or DS or SX component).

The substrate 4 may be metallic and/or ceramic. Particularly in the case of turbine components, for example turbine rotor blades 120 or guide vanes 130 (FIGS. 16, 17), heat shield elements 155 (FIG. 18) and other housing parts of a steam or gas turbine 100 (FIG. 16), but also an aircraft turbine, the substrate 4 consists of a nickel-, cobalt- or iron-based superalloy. In the case of turbine blades for aircraft, the substrate 4 consists for example of titanium or a titanium based alloy.

The substrate 4 comprises a hole 7, which is for example a through-hole. It may however also be a blind hole. The hole 7 consists of a lower region 10 which starts from an inner side of the component 1 and is for example designed symmetrically (for example circularly, ovally or rectangularly), and an upper region 13 which is optionally designed as a diffusor 13 on an outer surface 14 of the substrate 4. The diffusor 13 represents a widening of the cross section relative to the lower region 10 of the hole 7.

The hole 7 is for example a film cooling hole. In particular the inner-lying surface 12 of the diffusor 13, i.e. in the upper region of the hole 7, should be smooth in order to allow optimal outflow of a medium, in particular a coolant from the hole 7, because irregularities generate undesired turbulences or deviations. Much less stringent requirements are placed on the quality of the hole surface in the lower region 10 of the hole 7, since the arriving flow behavior is affected only little by this.

FIG. 2 shows a component 1 which is configured as a layer system.

On the substrate 4, there is at least one layer 16.

This may for example be a metal alloy of the MCrAlX type, where M stands for at least one element of the group ion, cobalt or nickel. X stands for yttrium and/or at least one rare earth element.

The layer 16 may also be ceramic.

The component 1 is preferably a layer system in which is also a further layer 16" on the MCrAlX layer 16', for example a ceramic layer as a thermal barrier layer. The thermal barrier layer 16" is for example a fully or partially stabilized zirconium oxide layer, in particular an EB-PVD layer or plasma sprayed (APS, LPPS, VPS), HVOF or CGS (cold gas spraying) layer.

A hole 7 with the lower region 10 and the diffusor 13 is likewise introduced in this layer system 1.

The following comments regarding production of the hole 7 apply to substrates 4 with and without a layer 16 or layers 16', 16".

FIG. 3 shows a plan view of a hole 7.

The lower region 10 could be produced by a machining fabrication method. For the diffusor 13, on the other hand, this would not be possible or would be possible only with very great outlay.

The hole 7 may also extend at an acute angle to the surface 14 of the component 1.

Method

Figure 5:
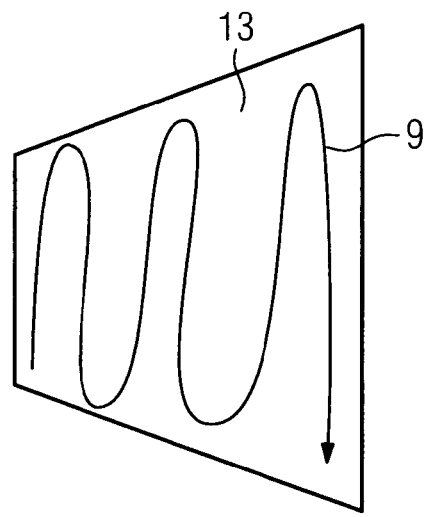
Figure 6:
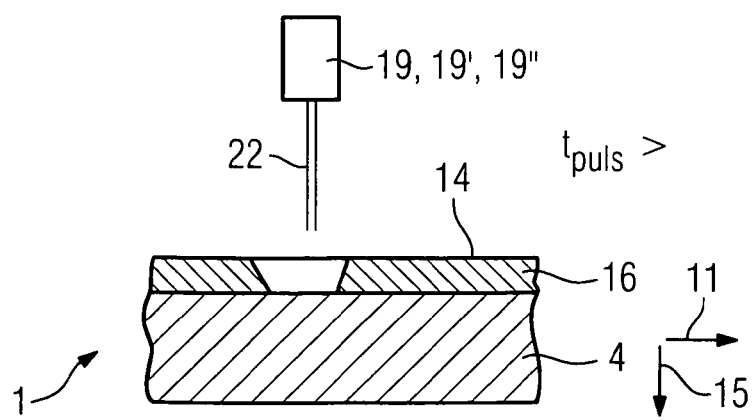

FIGS. 4, 5 and 6 show ablation steps of the method according to the invention.

According to the invention, energy beams 22 with different pulse lengths are used during the method.

The energy beam may be an electron beam, laser beam or high-pressure water jet. The use of a laser will be discussed below merely by way of example.

Particularly in one of the first ablation steps, shorter pulses (tpulse<<) preferably less than or equal to 500 ns, in particular less than or equal to 100 ns are used.

Pulse lengths in the picosecond or femtosecond range may also be used.

When using shorter pulse lengths of less than or equal to 500 ns (nanoseconds), in particular less than or equal to 100 ns, almost no melting takes place in the region of the interface. No cracks are therefore formed on the inner surface 12 of the diffusor 13, and exact plane geometries can thus be generated. The shorter pulse lengths are all shorter in time than the longer pulse lengths.

Figure 9:
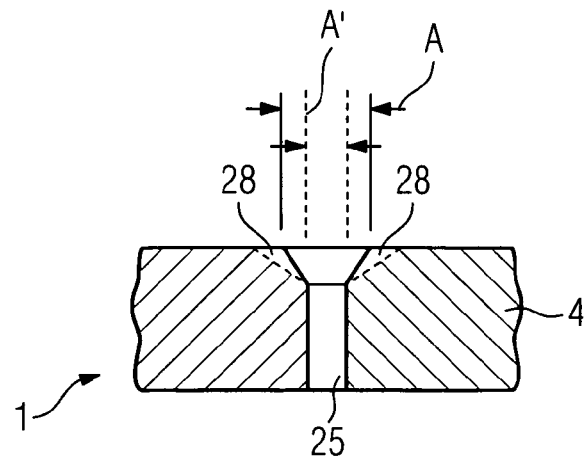

In one of the first ablation steps, a first subregion of the hole 7 is produced in the component 1. This may for example correspond at least partially or fully to the diffusor 13 (FIGS. 6, 9). The diffusor 13 is for the most part arranged in a ceramic layer. In particular, a shorter pulse length is used for producing the entire diffusor 13. In particular, a constant shorter pulse length is used for producing the diffusor 13. The time to produce the diffusor 13 corresponds for example to the first ablation steps in the method.

For producing the diffusor 13, a laser 19, 19', 19" with its laser beams 22, 22', 22" is preferably displaced to and fro in a lateral plane 43, as is represented for example in FIG. 5. The diffusor 13 is displaced along a displacement line 9, for example in the shape of a meander, in order to ablate material here in a plane (step FIG. 4 to FIG. 6).

Preferably, but not necessarily, longer pulse lengths (tpulse>) is greater than 0.4 ms, in particular greater than 0.5 ms and in particular 10 ms, are used to produce the remaining lower region 10 of the hole once a metallic interlayer 16' or the substrate 4 has been reached, as represented in FIG. 1 or 2.

The diffusor 13 is at least for the most part located in a ceramic layer 16", although it may also extend into a metallic interlayer 16' and/or into the metallic substrate 4 so that metallic material may likewise sometimes be ablated with shorter pulse lengths.

In particular for producing the lower region 10 of the hole 7, longer, in particular temporally constant pulse lengths are used for the most part or entirely. The time to produce the lower region 10 corresponds for example to the last ablation steps in the method.

When using longer pulse lengths, the at least one laser 19, 19', 19" with its laser beams 22, 22', 22" is preferably not displaced to and fro in the plane 43. Since the energy is distributed owing to thermal conduction in the material of the layer 16 or of the substrate 4 and new energy is added by each laser pulse, material is ablated over a large area by material evaporation in such a way that the area in which the material is ablated corresponds approximately to the cross-sectional area A of the through-hole 7, 10 to be produced. This cross-sectional area may be adjusted via the energy power and pulse duration as well as the guiding of the laser beam 22 (position of the focus at a horizontal distance from the surface 14).

The laser pulse lengths of a single laser 19 or a plurality of lasers 19', 19" may for example be varied continuously, for example from the start to the end of the method. The method begins with the ablation of material on the outer surface 14 and ends when the desired depth of the hole 7 is reached.

The layer is for example ablated progressively layer-by-layer in planes 11 (FIG. 6) and in an axial direction 15.

Likewise, the pulse lengths may also be varied discontinuously. Preferably only two different pulse lengths are used during the method. For the shorter pulse lengths (for example ≦500 ns) the at least one laser 19, 19' is displaced, and for the longer pulse lengths (for example 0.4 ms) for example it is not displaced because the energy input in any case takes place over a larger area than corresponds to the cross section of the laser beam owing to thermal conduction.

During the processing, the remaining part of the surface may be protected by a powder layer, in particular by masking according to EP 1 510 593 A1. The powder (BN, $ZrO_2$) and the particle size distribution according to EP 1 510 593 A1 are part of this disclosure for the use of masking.

This is expedient in particular when processing a metallic substrate or a substrate with a metallic layer, which does not yet have a ceramic layer.

Laser Parameters

When using pulses with a particular pulse length, the output power of the laser 19, 19', 19" is for example constant.

For the longer pulse lengths, an output power of the laser 19, 19', 19" in excess of 100 watts, in particular 500 watts, is used.

For the shorter pulse lengths, an output power of the laser 19, 19' less than 300 watts is used.

A laser 19, 19' with a wavelength of 532 nm is for example used only to generate shorter laser pulses.

For the longer pulse lengths, in particular a laser pulse of >0.4 ms, in particular up to 1.2 ms, and an energy (joules) of the laser pulse from 6 J to 21 J, in particular >10 J, is used, a power (kilowatts) of from 10 kW to 50 kW, in particular 20 kW, being preferred.

The shorter laser pulses have an energy in the single-figure or two-figure millijoule (mJ) range, preferably in the single-figure millijoule range, the power used usually lying particularly in the single-figure kilowatt range.

Number of Lasers

The method may employ one laser, or two or more lasers 19', 19" which are used simultaneously or successively. The similar or different lasers 19, 19', 19" have for example different ranges in respect of their laser pulse lengths. For example a first laser 19' may generate laser pulse lengths of less than or equal to 500 ns, in particular less than 100 ns, and a second laser 19" may generate laser pulse lengths of more than 100 ns, in particular more than 500 ns.

In order to produce a hole 7, the first laser 19' is used first. The second laser 19" is then used for the further processing, or vice versa.

For producing the through-hole 7, it is also possible to use only one laser. In particular, a laser 19 is used which for example has a wavelength of 1064 nm and can generate both the longer laser pulses and the shorter laser pulses.

Sequence of Hole Regions to be Produced

Figure 7:
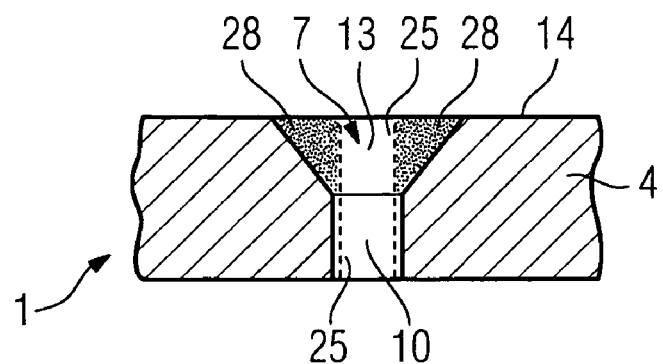

FIG. 7 shows a cross section through a hole 7.

Here, coarse processing is initially carried out with laser pulse lengths of more than 100 ns, in particular more than 500 ns, and fine processing is carried out with laser pulse lengths of less than or equal to 500 ns, in particular less than or equal to 100 ns.

The lower region 10 of the hole 7 is processed fully and only a region of the diffusor 13 is processed for the most part with a laser 19 which has laser pulse lengths of more than 100 ns, in particular greater than or equal to 500 ns (first ablation steps).

In order to fabricate the hole 7 or the diffusor 13, only a thin outer edge region 28 in the vicinity of the diffusor 13 still needs then needs to be processed by means of a laser 19, 19', 19" which can generate laser pulse lengths of less than or equal to 500 ns, in particular less than 100 ns (last ablation steps).

The laser beam 22, 22', 22" is preferably displaced in this case.

Figure 8:
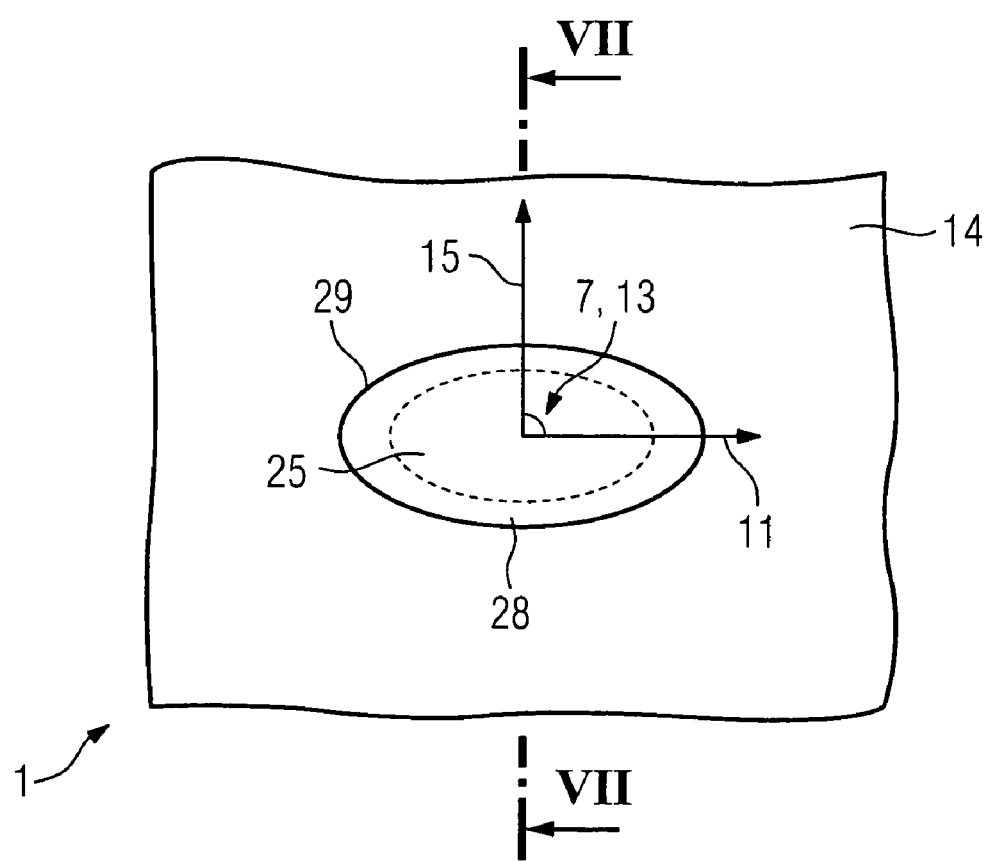

FIG. 8 shows a plan view of a hole 7 of the component 1.

The various lasers 19, 19', 19" or the different laser pulse lengths of these lasers 19, 19', 19" are used in different ablation steps.

First, for example, coarse processing is carried out with long laser pulse lengths (>100 ns, in particular >500 ns). The majority of the hole 7 is thereby produced. This in a region is denoted by the reference 25. Only an outer edge region 28 of the hole 7 or of the diffusor 13 must now be removed in order to reach the final dimensions of the hole 7.

The laser beam 22, 22' is in this case displaced in the plane of the surface 14.

The hole 7 or the diffusor 13 is not completed until the outer edge region 28 has been processed by means of a laser 19, 19' with shorter laser pulse lengths (≦500 ns, in particular <100 ns).

The contour 29 of the diffusor 13 is thus produced by shorter laser pulses, so that the outer edge region 28 is ablated more finely and more exactly and is therefore free from cracks and melting.

The material is for example ablated in a plane 11 (perpendicularly to the axial direction 15).

Likewise, for the longer pulse lengths, the cross section A of the region to be ablated when producing the hole 7 may be reduced continuously in the depth direction of the substrate 4 to A', so that the outer edge region 28 is made smaller compared with FIG. 7 (FIG. 9). This is done by adjustments of energy and pulse duration.

Figure 10:
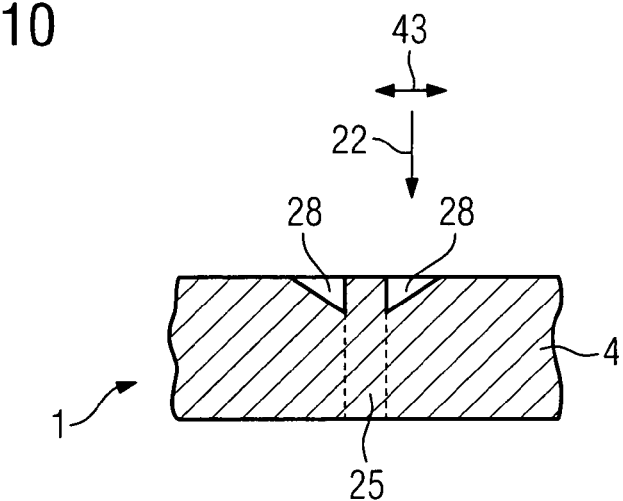

An alternative for producing the hole 7 consists in initially producing the outer edge region 28 with shorter laser pulse lengths (≦500 ns) to a depth in the axial direction 15 which corresponds partly or fully to an extent of the diffusor 13 of the hole 7 in this direction 15 (FIG. 10, the inner region 25 is indicated by dashes).

The laser beam 22, 22' is displaced in the plane of the surface 14 in these first ablation steps.

Virtually no melting is therefore generated in the region of the interface of the diffusor 13 and no cracks are formed there, and exact geometries can thus be generated.

Only then is the inner region 25 ablated with longer pulse lengths (>100 ns, in particular >500 ns) (last ablation steps).

The method may be applied to newly produced components 1, which have been cast for the first time.

The method may likewise be used for components 1 to be refurbished.

Refurbishment means that components 1, which have been in use, are for example separated from layers and are recoated again after repair, for example filling cracks and removing oxidation and corrosion products.

Here, for example, contaminants or coating material which has been applied again (FIG. 11) and has entered the holes 7, is removed by a laser 19, 19'. Alternatively, special shapes (diffusers) are newly produced in the layer region after recoating during the refurbishment.

Refurbishment

Figure 11:
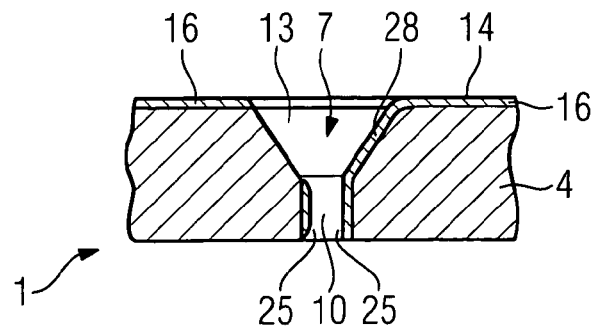

FIG. 11 shows the refurbishment of a hole 7, wherein material has penetrated into the already existing hole 7 during coating of the substrate 4 with the material of the layer 16.

For example, the more deeply lying regions in the vicinity 10 of the hole 7 may be processed with a laser which has pulse lengths of more than 100 ns, in particular more than 500 ns. These regions are denoted by 25.

The more critical edge region 28, for example in the vicinity of the diffusor 13 on which contamination is present, is processed by a laser 19' which has laser pulse lengths of less than or equal to 500 ns, in particular less than 100 ns.

Device

FIGS. 12 to 15 show exemplary devices 40, in particular for carrying out the method according to the invention.

The devices 40 consist of at least one optical component 35, 35', in particular at least one lens 35, 35' which directs at least one laser beam 22, 22', 22" onto the substrate 4 in order to produce the hole 7.

There are one, two or more lasers 19, 19', 19". The laser beams 22, 22', 22" may be guided to the optics 35, 35' via mirrors 31, 33.

The mirrors 31, 33 can be moved or rotated so that, for example, only one laser 19', 19" can respectively send its laser beams 22' or 22" via the mirror 31 or 33 and the lens 35 onto the component 1.

The component 1, 120, 130, 155 or the optics 35, 35' or the mirrors 31, 33 can be displaced in a direction 43 so that the laser beam 22, 22' is displaced over the component 1, for example according to FIG. 5.

The lasers 19, 19', 19" may for example have a wavelength of either 1064 nm or 532 nm.

The lasers 19', 19" may have different wavelengths: 1064 nm and 532 nm.

In respect of pulse length, the laser 19' is for example adjustable to pulse lengths of 0.1-5 ms; conversely, the laser 19" to pulse lengths of 50-500 ns.

By moving the mirrors 31, 33 (FIGS. 12, 13, 14), the beam of the laser 19', 19" having those laser pulse lengths which are required, for example to produce the outer edge region 28 or the inner region 25, can respectively be delivered via the optics 35 onto the component 1.

Figure 12:
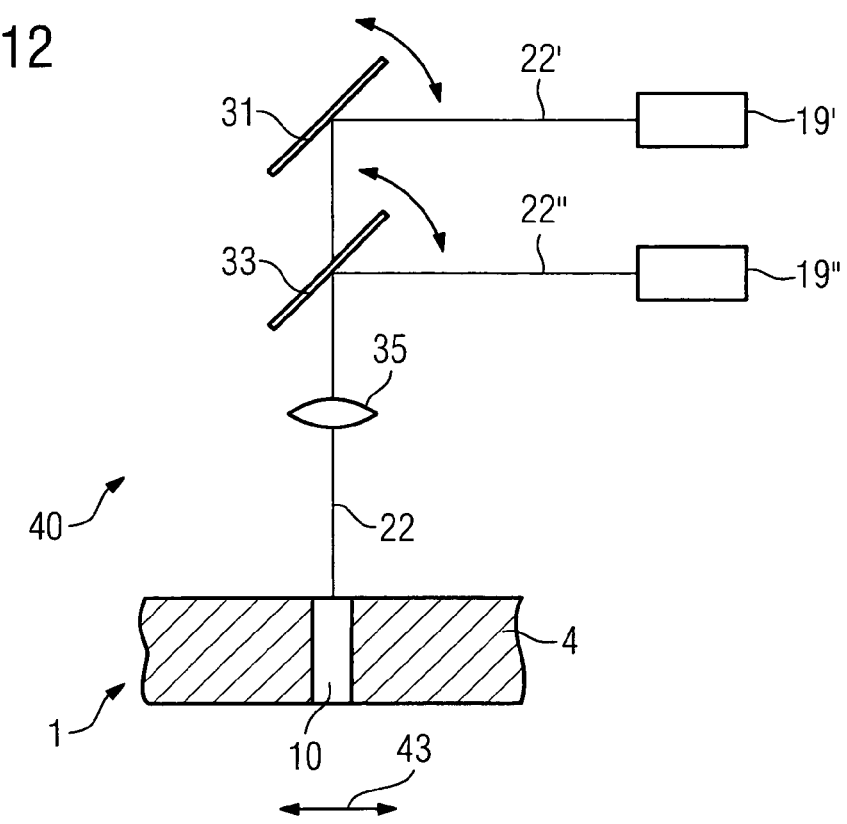
FIGS. 12-15 show apparatus for carrying out the method.

FIG. 12 shows two lasers 19', 19", two mirrors 31, 33 and one optical component in the form of the lens 35.

If for example the outer edge region 28 is initially produced according to FIG. 6, then the first laser 19' with the shorter laser pulse lengths will be connected up.

If the inner region 25 is then produced, then the first laser 19' will be disconnected by moving the mirror 31 and the second laser 19" with its longer laser pulse lengths will be connected up by moving the mirror 33.

Figure 13:
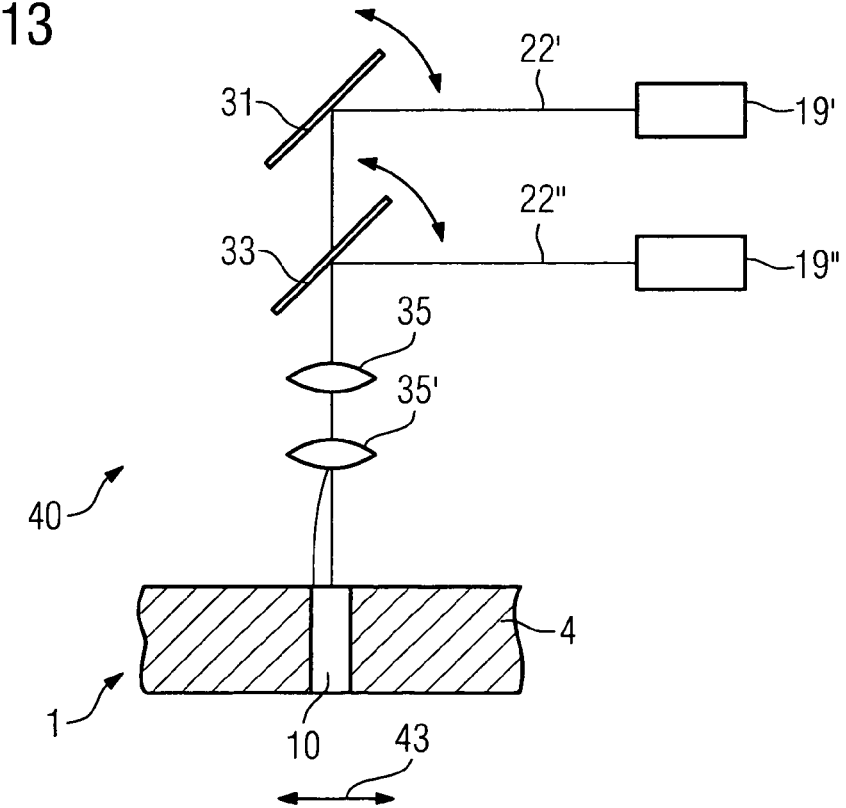

FIG. 13 shows a similar device as in FIG. 12, although here there are two optical components, here for example two lenses 35, 35', which make it possible to direct the laser beams 22', 22" of the lasers 19', 19" simultaneously onto different regions 15, 28 of the component 1, 120, 130, 155.

If for example an outer edge region 28 is being produced, the laser beam 22' may be directed onto a first position of this sleeve-shaped region 28 and onto a second position diametrically opposite the first position, so that the processing time is shortened considerably.

The optical component 35 may be used for the first laser beam 22' and the second optical component 35' for the second laser beam 22".

According to this device 40, the lasers 19', 19" may be used successively or simultaneously with equal or different laser pulse lengths.

Figure 14:
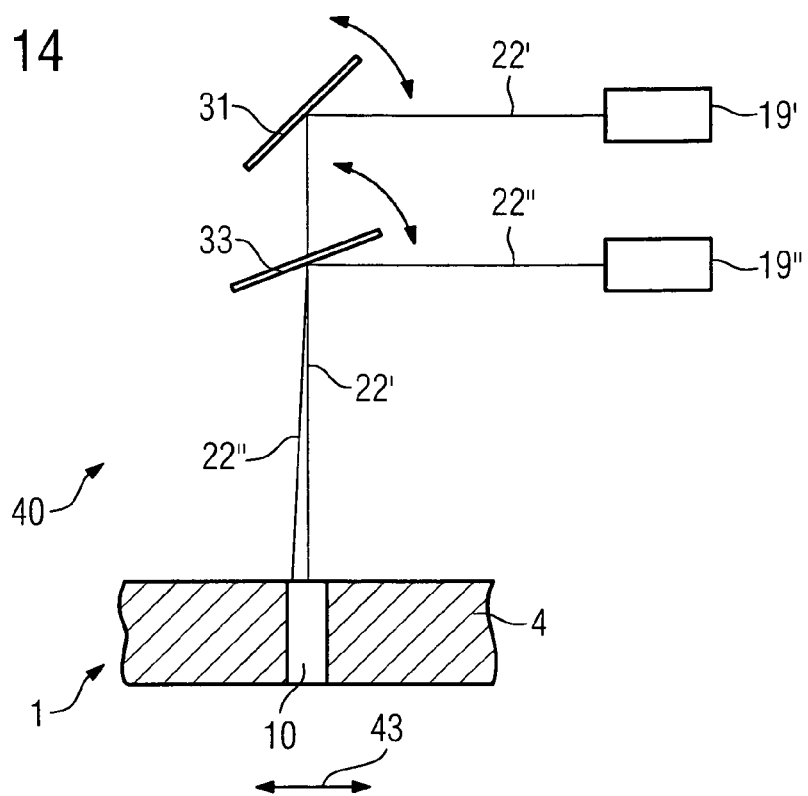

In FIG. 14 there are no optical components in the form of lenses, instead only mirrors 31, 33 which direct the laser beams 22', 22" onto the component 1 and, by movement, are used to displace the at least one laser beam 22', 22" in a plane over the component.

The lasers 19', 19" may likewise be used simultaneously here.

According to this device 40, the lasers 19', 19" may be used successively or simultaneously with equal or different laser pulse lengths.

Figure 15:
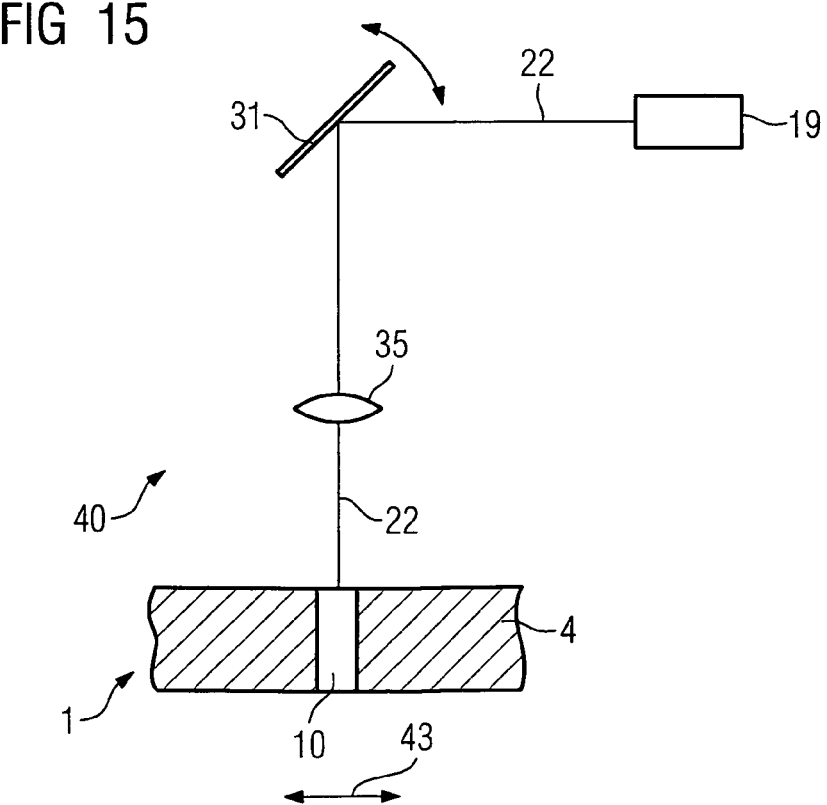

FIG. 15 shows a device 40 with only one laser 19 in which the laser beam 22 is directed for example via a mirror 31 onto a component 1.

Here again, an optical component for example in the form of a lens is not necessary. The laser beam 22 is for example displaced over the surface of the component 1 by moving the mirror 31. This is necessary when using shorter laser pulse lengths. For the longer laser pulse lengths the laser beam 22 to need not necessarily be displaced, so that the mirror 31 is not moved as it is in the method stage.

Nevertheless, a lens or two lenses 35, 35' may likewise be used in the device according to FIG. 15 in order to direct the laser beam simultaneously onto different regions 25, 28 of the component 1, 120, 130, 155.

Components

Figure 16:
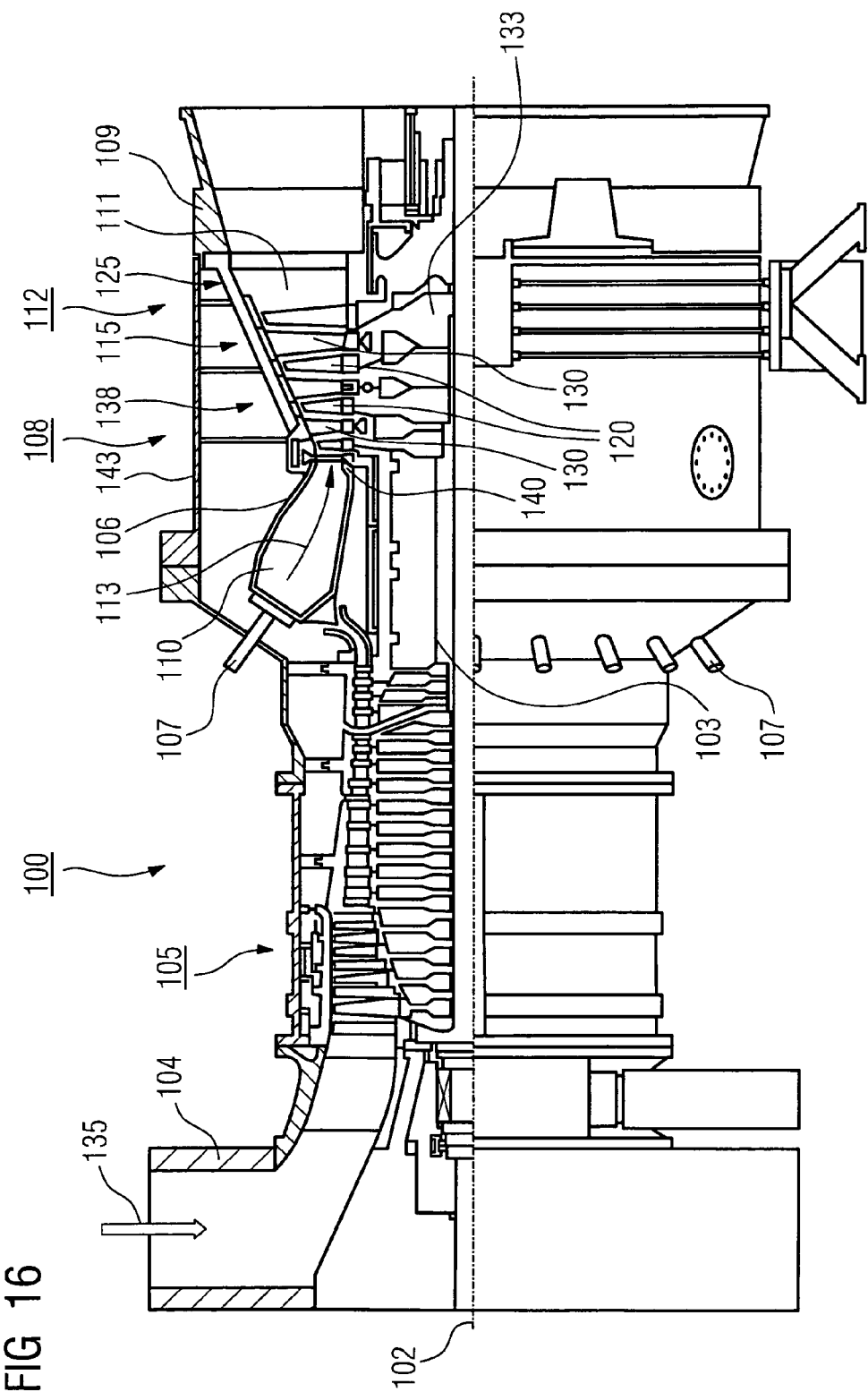
FIG. 16 shows a gas turbine.

FIG. 16 shows a gas turbine 100 by way of example in a partial longitudinal section.

The gas turbine 100 internally comprises a rotor 103, which will also be referred to as the turbine rotor, mounted so as to rotate about a rotation axis 102 and having a shaft 101. Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the end of the compressor 105 on the turbine side is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS structure).

Iron-, nickel- or cobalt-based superalloys used as material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949 are used; with respect to the chemical composition of the alloys, these documents are part of the disclosure.

The guide vane 130 comprises a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 17:
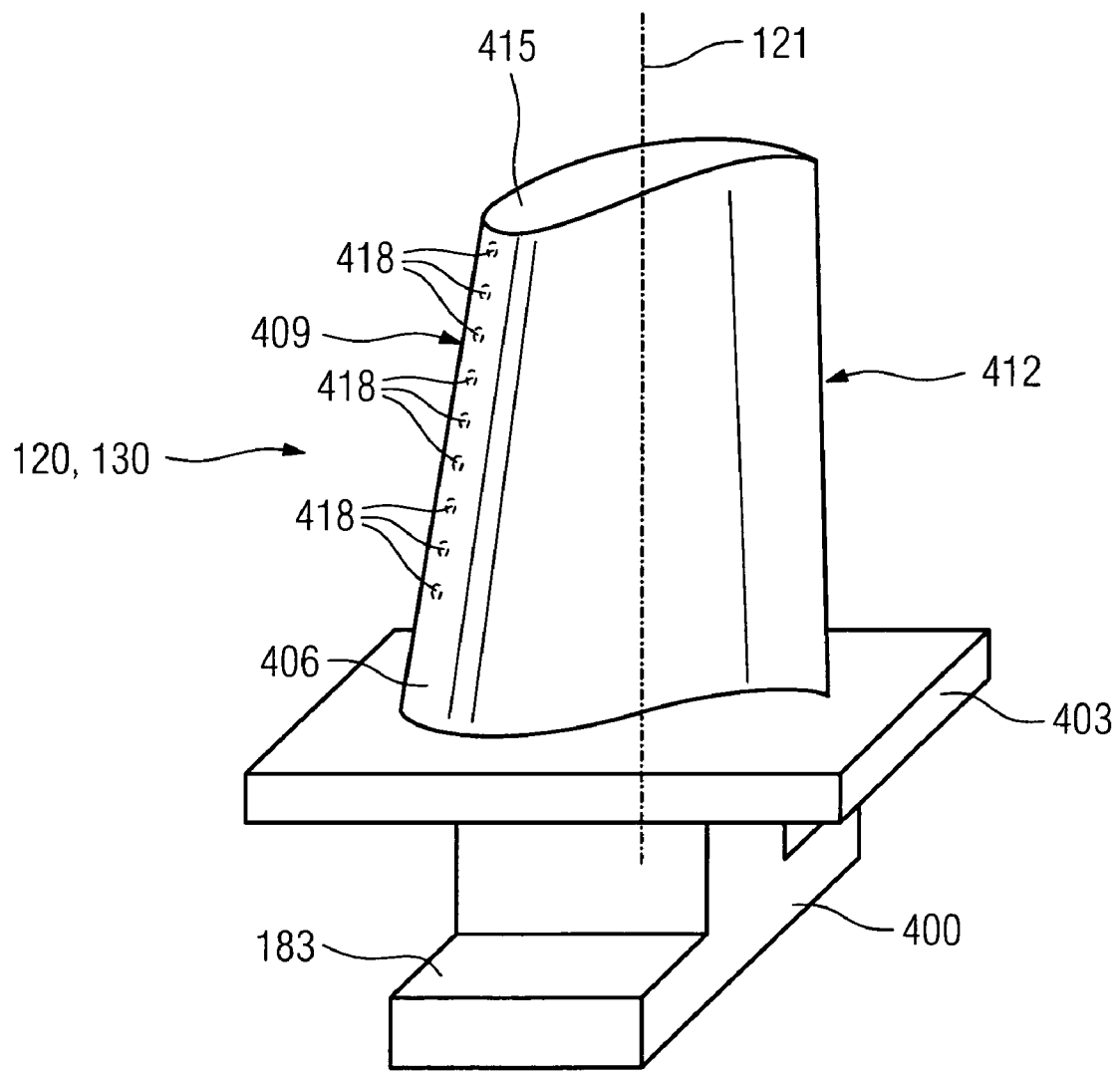
FIG. 17 shows a turbine blade and
FIG. 18 shows a combustion chamber.

FIG. 17 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406 and a blade tip 415.

As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a fir-tree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation.

Such monocrystalline workpieces are manufactured, for example, by directional solidification from the melts. These are casting methods in which the liquid metal alloy is solidified to form a monocrystalline structure, i.e. to form the monocrystalline workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; with respect to the solidification method, these documents are part of the disclosure.

The blades 120, 130 may likewise have coatings against corrosion or oxidation, for example (MCrAlX; M is at least one element from the group iron (Fe), cobalt (Co), nickel (Ni), X is an active element and stands for yttrium (Y) and/or silicon and/or at least one rare earth element, or hafnium (HD). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

The density may preferably be 95% of the theoretical density.

A protective aluminum oxide layer (TGO=thermal grown oxide layer) is formed on the MCrAlX layer (as an interlayer or as the outermost layer).

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide.

The thermal barrier layer covers the entire MCrAlX layer. Rod-shaped grains are produced in the thermal barrier layer by suitable coating methods, for example electron beam deposition (EB-PVD).

Other coating methods may be envisaged, for example atmospheric plasma spraying (APS), LPPS, VPS or CDV. The thermal barrier layer may comprise produces porous, micro- or macro-cracked grains for better thermal shock resistance. The thermal barrier layer is thus preferably more porous than the MCrAlX layer.

The blade 120, 130 may be designed to be hollow or solid.

If the blade 120, 130 is intended to be cooled, it will be hollow and optionally also comprise film cooling holes 418 (indicated by dashes) which are produced by the method according to the invention.

Figure 18:
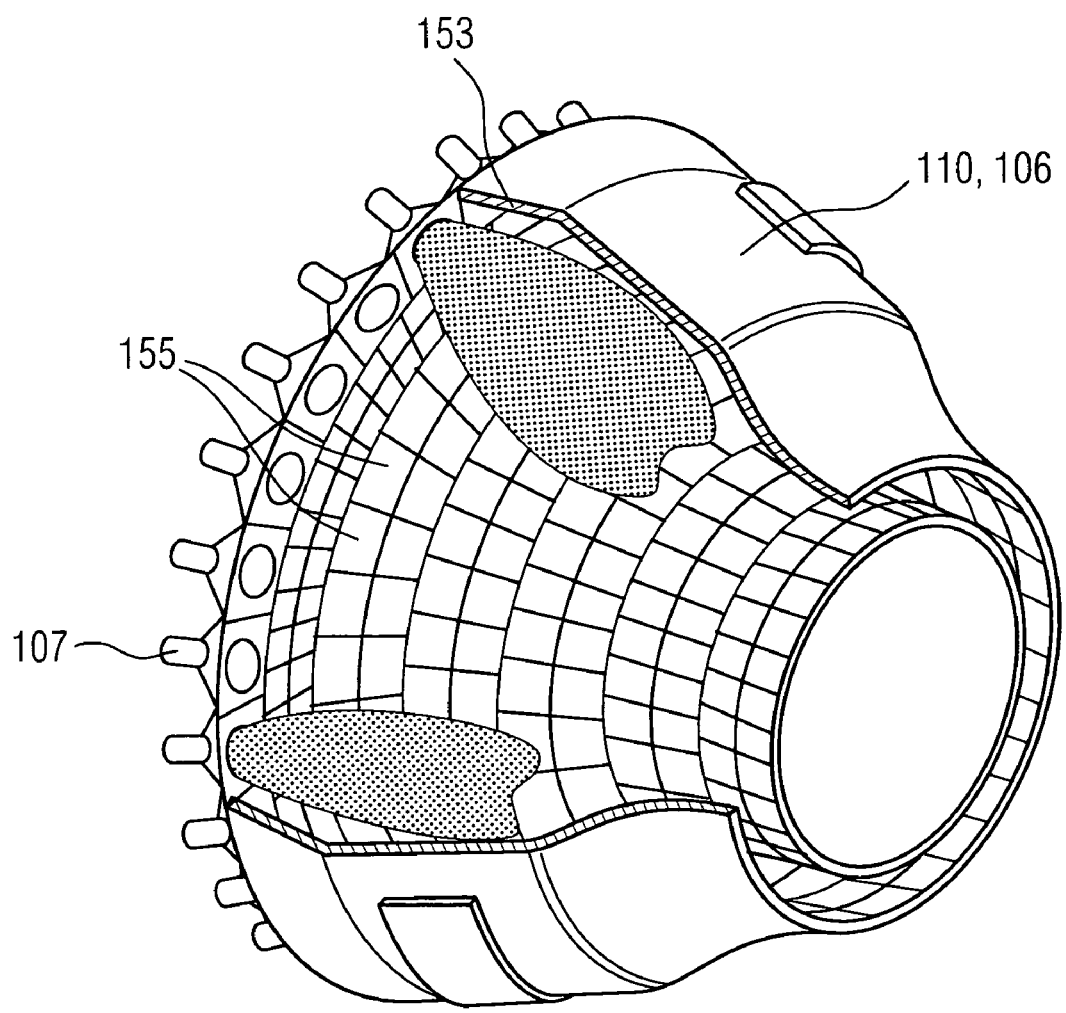

FIG. 18 shows a combustion chamber 110 of a gas turbine 100.

The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Owing to the high temperatures inside the combustion chamber 110, a cooling system may also be provided for the heat shield elements 155 or for their retaining elements. The heat shield elements 155 are then hollow, for example, and optionally also have film cooling holes (not shown) opening into the combustion chamber space 154, which are produced by the method according to the invention.

Each heat shield element 155 made of an alloy is equipped with a particularly heat-resistant protective layer (MCrAlX layer and/or ceramic coating) on the working medium side, or is made of refractory material (solid ceramic blocks).

These protective layers may be similar to the turbine blades, i.e. for example MCrAlX means: M is at least one element from the group iron (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX, there may furthermore be an e.g. ceramic thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance.

Refurbishment means that turbine blades 120, 130 and heat shield elements 155 may need to have protective layers taken off (for example by sandblasting) after their use. The corrosion and/or oxidation layers or products are then removed. Optionally, cracks in the turbine blade 120, 130 or the heat shield element 155 are also repaired. The turbine blades 120,

130 or heat shield elements 155 are then recoated and the turbine blades 120, 130 or the heat shield elements 155 are used again.

The invention claimed is:

1. A method for producing a hole in a layer system, comprising:
providing a layer system having a metallic substrate and an outermost ceramic layer, providing a pulsed energy beam with a shorter pulse length and a longer pulse length; and
using different pulse lengths in different ablation steps, wherein the longer pulse length of the different pulse lengths has a pulse lengths of >0.4 ms.

2. The method as claimed in claim 1, wherein the energy beam is a laser beam, wherein the laser beam is displaced over the surface of the component during the ablation steps with shorter pulse lengths, in order to ablate material in the region of a plane of the hole to be produced.

3. The method as claimed in claim 1,
wherein longer pulse lengths greater than 400 ns are used during first ablation steps in order to ablate a metallic interlayer or the metallic substrate;
and wherein shorter pulse lengths of less than or equal to 400 ns are used in one of last ablation steps.

4. The method as claimed in claim 1, wherein shorter longer pulse lengths are used during first ablation steps than in one of last ablation steps.

5. The method as claimed in claim 1, wherein the longer pulse length is used in order to ablate a metallic interlayer or the metallic substrate.

6. The method as claimed in claim 1, wherein the pulse length is varied continuously or discontinuously in the course of producing the hole.

7. The method as claimed in claim 1, wherein only two different pulse lengths are used.

8. The method as claimed in claim 1, wherein the at least one energy beam is displaced over the surface of the component in the case of the longer pulse durations.

9. The method as claimed in claim 1, wherein only one laser with a wavelength of 1064 nm or 532 nm is used.

10. The method as claimed in claim 1, wherein a plurality of lasers are used to produce the hole.

11. The method as claimed in claim 10, wherein different wavelengths of 1064 nm and 532 nm are used for the lasers.

12. The method as claimed in claim 10, wherein at least two lasers are used simultaneously.

13. The method as claimed in claim 1, wherein shorter pulse lengths of less than or equal to 500 ns are used during last ablation steps or during the first ablation steps.

14. The method as claimed in claim 1, wherein an outer upper region of the hole is initially produced with shorter pulse lengths and then a lower region of the hole is produced with longer pulse lengths.

15. The method as claimed in claim 1, wherein an outer edge region is initially produced with shorter pulse lengths and then an inner region of the hole is produced with longer pulse lengths.

16. The method as claimed in claim 1, wherein an inner region is initially produced with longer pulse lengths, and then an outer edge region of the hole is produced with shorter pulse lengths.

17. The method as claimed in claim 1, wherein a pulse duration of from >0.4 ms to 1.2 ms is used for the longer pulses.

18. The method as claimed in claim 1, wherein the longer pulses have an energy of from 6 to 21 joules.

19. The method as claimed in claim 1, wherein the longer pulses have a power of from 10 to 50 kW.

20. The method as claimed in claim 1, wherein the energy of the shorter pulses lies in or below a two-figure millijoule range.

21. The method as claimed in claim 1, wherein the longer pulses generate the cross-sectional area of the region to be ablated on the component corresponding to the cross-sectional area of the hole to be produced.

22. The method as claimed in claim 1, wherein an output power of the laser of less than 300 watts is used for the shorter pulses.

23. The method as claimed in claim 1, wherein the layer system consists of a substrate and a metallic layer, wherein the layer system has a composition of a MCrAlX type, wherein M stands for at least one element of the group consisting of iron, cobalt or nickel, and wherein X stands for yttrium and/or at least one rare earth element.

24. The method as claimed in claim 23, wherein the substrate is a nickel-, cobalt- or iron-based superalloy.

25. The method as claimed in claim 1, wherein a component which is a turbine blade, a heat shield element or another component or housing part of a gas turbine or steam turbine, is processed by the method.

26. The method as claimed in claim 1, wherein the method is used for a new production of a component.

27. The method as claimed in claim 1, wherein the method is used for a component to be refurbished.

* * * * *